Figure 1:
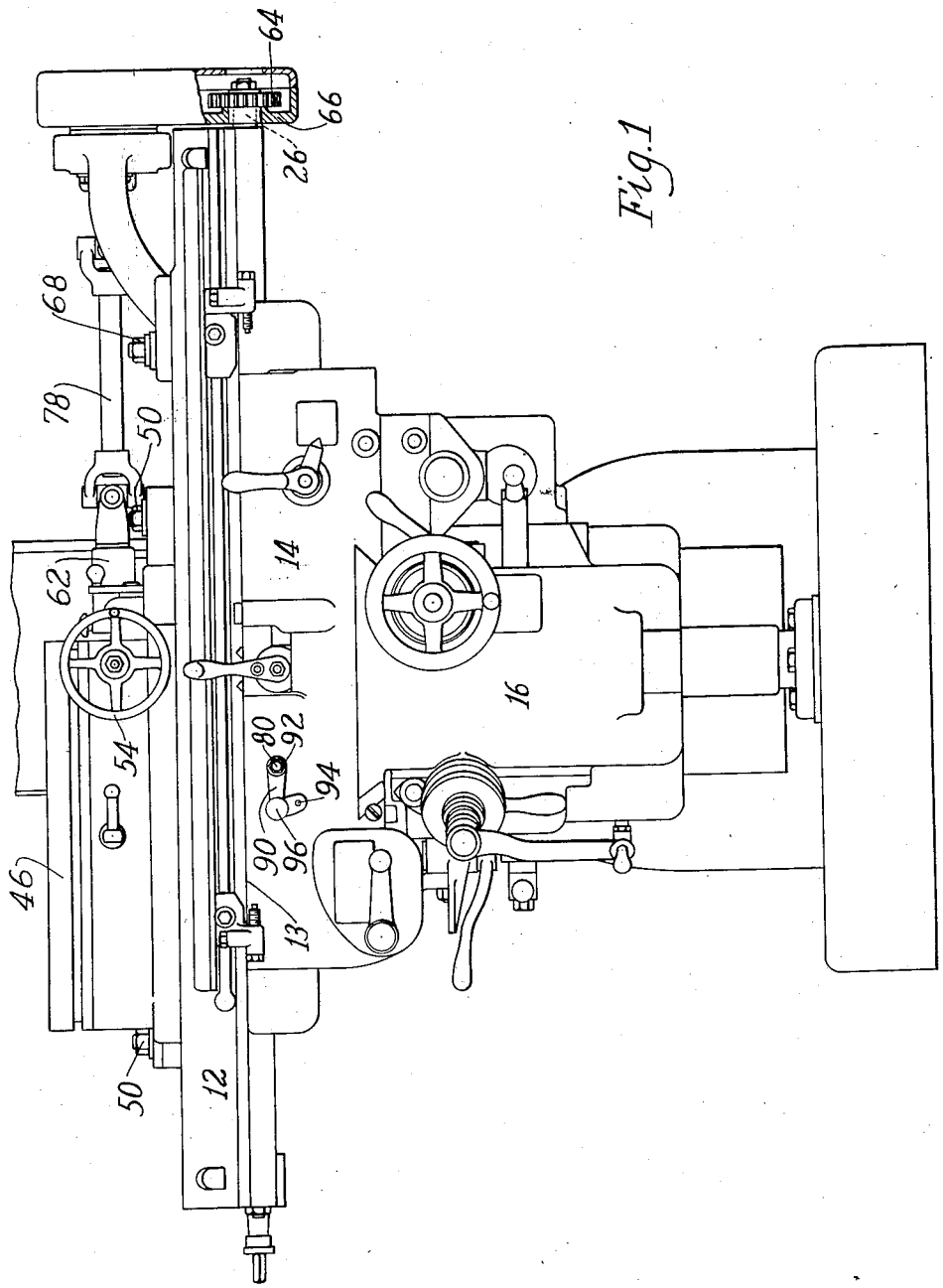

Sept. 4, 1934.　　　　W. F. SMITH　　　　1,972,633
MILLING MACHINE
Filed July 11, 1931　　3 Sheets-Sheet 1

Witness
Chas. T. Olson

Inventor
Walter F. Smith
by his attorneys
Van Everen, Fish, Hildreth & Hary

Sept. 4, 1934. W. F. SMITH 1,972,633
MILLING MACHINE
Filed July 11, 1931  3 Sheets-Sheet 2
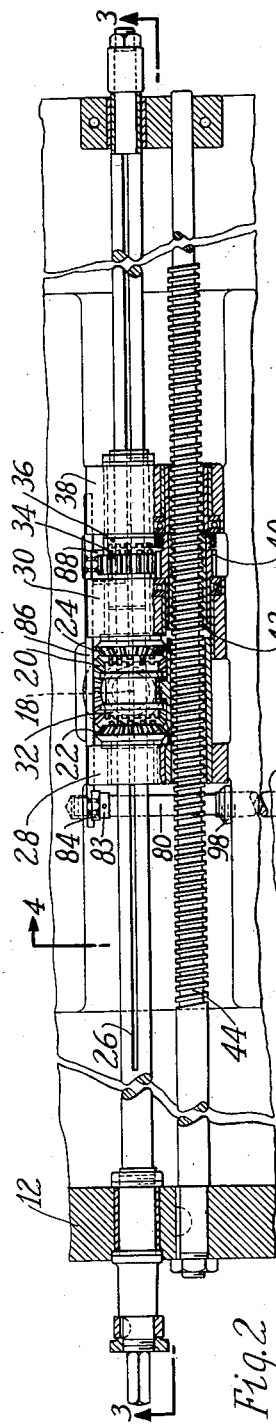
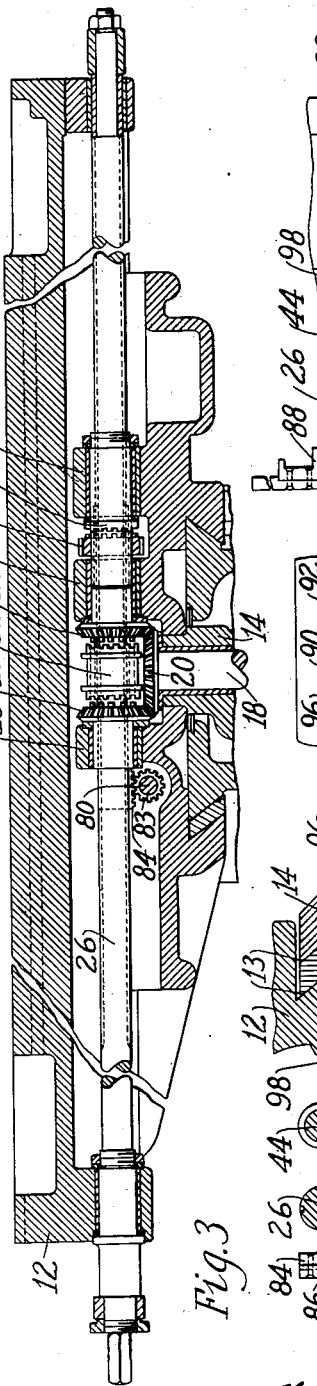
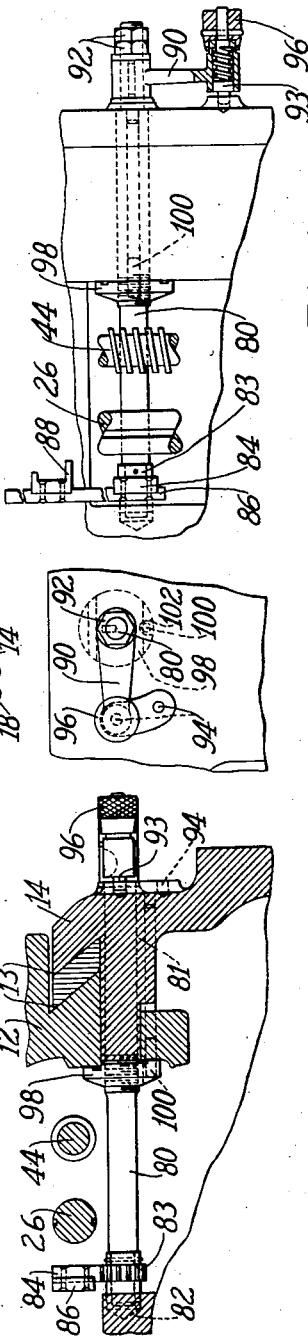
Witness
Chas. T. Olson
Inventor
Walter F. Smith Sept. 4, 1934.   W. F. SMITH   1,972,633
MILLING MACHINE
Filed July 11, 1931   3 Sheets-Sheet 3

Witness
Chas. T. Olson

Inventor
Walter F. Smith

Patented Sept. 4, 1934

1,972,633

UNITED STATES PATENT OFFICE 1,972,633

MILLING MACHINE

Walter F. Smith, Providence, R. I., assignor to Brown and Sharpe Manufacturing Company, a corporation of Rhode Island Application July 11, 1931, Serial No. 550,097

6 Claims. (Cl. 90—11)

The present invention relates to improvements in milling machines, and more particularly to improved mechanisms for controlling the operation of, and for locking against movement, the relatively movable supports on which the work is mounted for movement with relation to the operating tools.

The invention is herein disclosed as embodied in a milling machine of the general type which includes a vertical cutter spindle mounted on the machine column, and a work supporting table which is mounted for longitudinal movements on a saddle arranged for lateral movements on a vertically movable knee. The general arrangement of the mechanisms through which the required movements are imparted either manually or by power to the table, saddle or knee, are more fully described and illustrated in the copending application of Benjamin P. Graves and Charles F. Bennett, Serial No. 181,050, filed April 5, 1927.

For certain types of milling operations in which no longitudinal movement of the work table is required, it has been found desirable to clamp the table firmly against longitudinal movement on its ways to provide as rigid a base as possible for the work during the milling operation. Where the requirements of the work are such as to require movements to be imparted to the work relatively to the milling cutter which can not readily be obtained by the manipulation of the table, saddle and knee feeds, a special work support, such, for instance, as the circular milling attachment herein disclosed, is sometimes secured to the work table and is driven through the chain of gearing normally utilized for driving the table. A secondary clutch is provided for disconnecting the table from its driving mechanism while the table is clamped to the ways, and to permit the use of the power connections to the table drive for driving the special work support.

It is a primary object of the present invention to provide means under the control of the operator for clamping the table rigidly to its ways, which will act at the same time to disconnect the table from the table drive, and thus prevent possible interference and consequent injury to the parts.

Another object of the invention is to provide a novel and improved mechanism for clamping the table rigidly to the ways, which will be simple in construction and efficient in operation without causing an undue wear at the point of clamping contact.

Figures 7, 8:
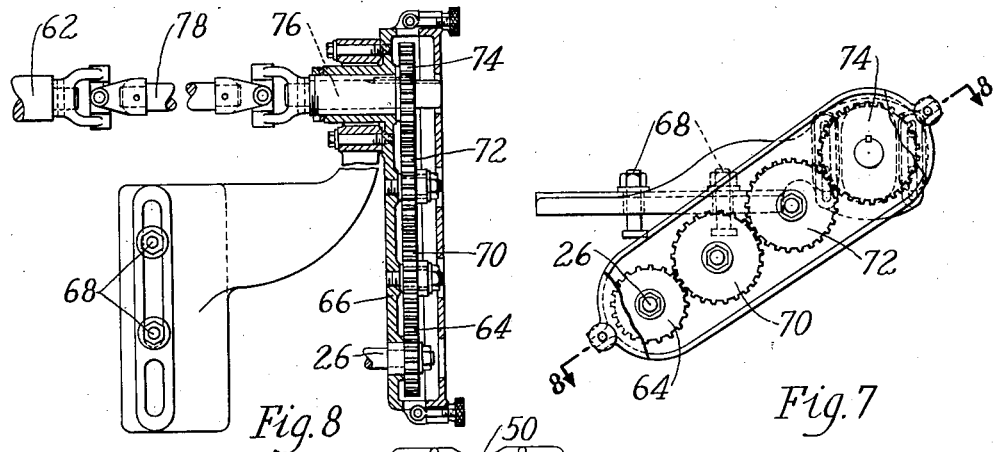
Figure 9:
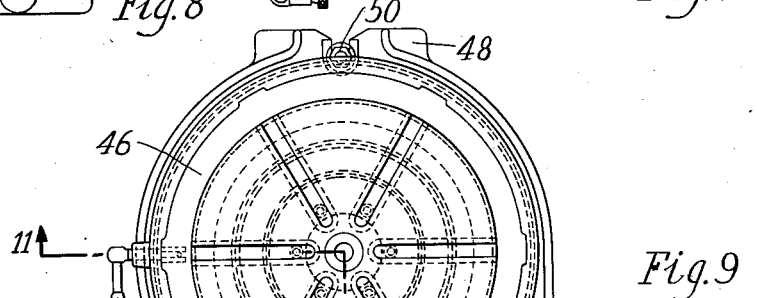
Figure 10:
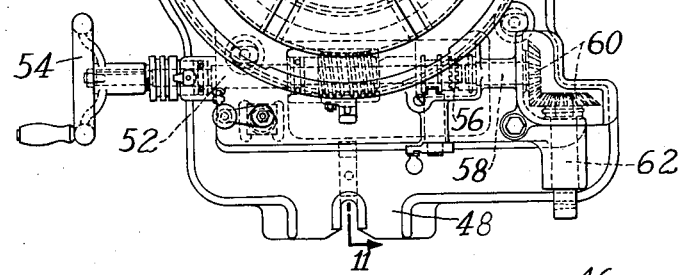
Figure 11:
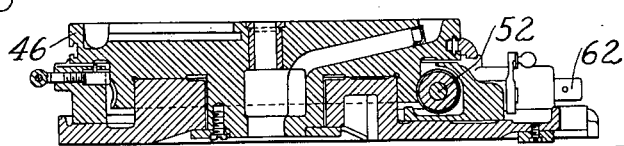

With these and other objects in view as may hereinafter appear, the several features of the invention consist in the devices, combinations and arrangements of parts hereinafter claimed, which together with the advantages to be obtained thereby will be readily understood by one skilled in the art from the following description taken in connection with the accompanying drawings, in which Fig. 1 is a view in front elevation of the lower half of the machine showing the table, saddle and knee and machine column on which these parts are mounted; Fig. 2 is a plan view partly in section of the table drive and the table clamp; Fig. 3 is a view taken on the line 3—3 of Fig. 2; Fig. 4 is a detail sectional view taken on the line 4—4 of Fig. 2; Fig. 5 is a detail view in front elevation of the control lever for the clamp and the secondary clutch to the table drive; Fig. 6 is a detail plan view of a portion of the mechanism outlined in Fig. 2 of the drawings, illustrating particularly the crank for moving the secondary clutch for the table, and for clamping the table; Fig. 7 is a detail view taken from the right side of the machine, illustrating particularly a portion of an attachment for imparting rotary movements to the work; Fig. 8 is a view taken substantially on the line 8—8 of Fig. 7; Fig. 9 is a somewhat diagrammatic plan view of the circular milling attachment; Fig. 10 is an end view of the attachment; and Fig. 11 is a view taken on line 11—11 of Fig. 9.

As disclosed in the drawings, the invention is shown in its preferred form in a milling machine of the vertical spindle type, only so much of the machine having been shown as is necessary to illustrate the connection of the present invention therewith. This machine is provided with a longitudinally movable work table 12 mounted for movement on ways 13 on a laterally movable saddle 14, which is in turn supported on the vertically movable knee 16. These parts may be driven either automatically or by hand through driving connections which may be of the same general description as those fully described and illustrated in the copending application Serial No. 181,050 above referred to. The driving connections for the table include a vertical drive shaft 18 (see Fig. 3) which is mounted in the saddle 14 and carries at its upper end a bevel gear 20 arranged to drive in opposite directions the two corresponding bevel gears 22 and 24 loosely sleeved to turn on a horizontally located drive shaft 26 which is journaled at each end in bearings in the table. The bevel gears 11( 22 and 24 are each journaled in bearings formed in brackets 28 and 30 on the saddle to maintain the gears at all times in mesh with the bevel gear 20 on the vertical drive shaft 18. The drive shaft 26 may be driven in either direction through this mechanism by means of a reversing clutch 32 which is keyed to slide on the drive shaft 26, and is movable in either direction into engagement with corresponding clutch surfaces formed on the adjacent faces of the two oppositely rotating bevel gears 22 and 24. The drive for the table is taken from the horizontal drive shaft 26 through a branch line transmission which includes a gear 34 loosely mounted to turn on the drive shaft 26 and journaled in bearings in the bracket 30. The gear 34 is provided on one face with a set of clutch teeth, and is movable lengthwise to bring these teeth into engagement with a corresponding clutch member 36 which is keyed to turn with the drive shaft 26, and is journaled against endwise movement therewith in a bearing formed in a bracket 38 on the saddle. The gear 34 meshes with a gear 40 formed on a feed nut 42 which is screw threaded to a lead screw 44 rigidly mounted in the table 12. The feed nut 42 is rotatably mounted in an external bearing formed in the saddle, arranged to prevent endwise movement of the feed nut with the table.

In a machine of the type herein disclosed it is frequently desirable to provide a special milling attachment which is mounted on the machine table for supporting the work, and is arranged to perform special milling operations which could not be readily carried out by the manipulation of the ordinary table, saddle and knee feeds. As shown in Figs. 1 and 8 to 11 of the drawings, the present machine has been provided with a circular milling attachment of ordinary description which is securely clamped to the machine table, and is arranged to be driven from the drive shaft 26 for the table feed. The circular milling attachment comprises a circular table 46 which is mounted to rotate on a supporting frame or bracket 48 which is securely fastened by bolts 50 to the work table 12. The table 46 is given a rotary movement by a drive shaft 52 mounted transversely of the bracket 48, and provided with a worm engaging with the corresponding teeth of a worm wheel formed on the table. At one end the shaft 52 is provided with a hand wheel 54 for manually operating the attachment. The other end of the drive shaft 52 is connected through a secondary clutch 56 to a short shaft 58 which is connected through bevel gears 60 to a drive shaft 62 journaled in the bracket 48 at right angles to the shaft 58. In order to provide a source of power for actuating the shaft 62 to drive the table 46, the end of the drive shaft 26 for the table feed is arranged to receive a gear 64 which is mounted in a bracket 66 fastened by bolts 68 to the end of the table 12, and is arranged through intermediate connections to drive the shaft 62. The gear 64 is connected through the idler gears 70 and 72 to the gear 74 on a shaft 76 which is connected through a link 78 provided at each end with universal connections to drive the shaft 62.

In carrying out the invention, a manual control mechanism has been provided to enable the operator to clamp the table 12 rigidly to the ways 13, and at the same time automatically to move the clutch gear 34 out of engagement with the clutch member 36 to disengage the table feed, so as to avoid any possibility of damage to the parts through the operation of the table feed while the table is clamped to the ways. This mechanism comprises a rock shaft 80 which is journaled for rotating and endwise movements in bearings 81 and 82 in the saddle directly beneath the ways 13 on which the table is mounted, and at its rear end is provided with a gear 83 engaging with a rack 84 secured to a lengthwise movable control bar 86. A yoke 88 secured to the control bar 86 embraces the gear clutch member 34 to control the position of the gear with relation to the clutch member 36. On the forward end of the rock shaft 80 is mounted a manual control lever 90 connected to turn therewith by means of a key 91 and held in position against the front face of the saddle by means of the locking nuts 92. A spring-pressed detent 93 mounted on the free end of the control lever 90 is arranged to fit alternatively into either of two recesses 94 to lock the lever in either of two positions corresponding to the open and closed positions of the gear clutch member 34. A knurled head 96 on the end of the plunger 93 provides a convenient means to enable the operator to retract the plunger 93 out of engagement with the corresponding recess 94 and turn the lever 90 when it is desired to shift the secondary clutch for connecting the table drive. There is also carried on the rock shaft 80 a clamping member 98 screw threaded thereto and held against rotation therewith by the engagement of a pin 100 projecting from the saddle into a corresponding slot 102 formed in the lower side of the clamping member 98. When the hand lever 90 is moved downwardly from the position shown in Fig. 5 to disengage the sleeve gear member 34 from the driving clutch member 36, the rotation of the rock shaft 80 causes the clamping member 98 to be moved lengthwise to bring its upper face into engagement with a corresponding surface on the table 12. The continued rotation of the rock shaft 80 and hand lever 90 to their limiting positions in which the detent plunger 92 is brought into locking engagement with the corresponding recess 94, causes the adjacent portion of the table and the way 13 to be clamped tightly together between the clamping member 98 and the hub of the control lever 90 fast on the rock shaft 80 to prevent any possible relative movements between these parts. A movement of the lever 90 upwardly to the position shown in Fig. 5, causes the clamping member to be moved lengthwise of the rock shaft 80 out of clamping engagement with the table 12 as the gear clutch member 34 is moved into contact with the clutch member 36 to connect the table feed.

Inasmuch as the clamping pressure exerted to lock the table 12 against movement on the ways 13 is determined by the amount of separation of the clamping member 98 from the hub of the manual control lever 90 along the control shaft 80 as compared to the thickness of the intervening portions of the table 12 and saddle 14, an adjustment of the clamping mechanism to secure the required clamping effect may be readily made from the front of the machine by loosening or tightening the locking nuts 92 as the case may be to move the hub of the hand lever 90 along the shaft and thus to lengthen or shorten the distance between the hub of the hand lever 90 and the clamping member 98.

The invention having been described, what is claimed is:

1. In a milling machine, the combination of a work support, ways on which the work support is mounted to slide, driving connections for moving the work support on the ways, a clutch in said connections arranged to disconnect the support from said driving connections, a manually operated control mechanism comprising a shaft rotatable to engage and disengage the clutch, and a clamping device comprising a clamping member threaded to a lead screw formed on the shaft and keyed against rotation therewith arranged when actuated by the rotation of the shaft in one direction to disengage the clutch, to engage with and clamp the work support rigidly to the ways, and actuated by the rotation of the shaft in an opposite direction to engage the clutch to move out of clamping engagement with the work support.

2. In a milling machine, the combination of a work support, ways upon which the work support is mounted to slide, driving connections for moving the work support on the ways, a clutch in said connections arranged to disconnect the support from said driving connections, a rotatable control shaft for the clutch located transversely of said work support and ways, an abutment on the shaft, and a clamping member screw threaded on the shaft and actuated by the rotation thereof for disengaging the clutch to clamp the ways and work support between said clamping member and said abutment.

3. In a milling machine, the combination of a work-support, ways upon which the work support is mounted to slide, driving connections for moving the work support on the ways, a clutch in said connections arranged to disconnect the support from said driving connections, a rotatable control shaft for the clutch located transversely of said work support and ways, an abutment on the shaft, a clamping member screw threaded on the shaft and actuated by the rotation thereof for disengaging the clutch to clamp the ways and work support between said clamping member and said abutment, and means for adjusting the position of said abutment on the shaft to adjust the clamping action of the clamping member for a given angle of rotation of the shaft.

4. In a milling machine, the combination of a work support, ways upon which the work support is mounted to slide, driving connections for moving the work support on the ways, a clutch in said connections arranged to disconnect the support from said driving connections, a rotatable control shaft for the clutch located transversely of said work support and ways, a manually operated control member keyed to turn with the shaft, a clamping member screw threaded to the shaft and keyed against rotation therewith, actuated by the rotation of the shaft for disengaging the clutch to clamp the ways and work support between said clamping member and the hub of said manual control member, and means for adjusting the position of the manual control member lengthwise of the shaft to adjust the clamping action of the clamping member for a given angle of rotation of the shaft.

5. In a milling machine, the combination of a work supporting table, a saddle, a knee, ways on the saddle on which the table is mounted to slide, driving connections for moving the table on the ways, a clutch in said connections arranged to disconnect the table from said driving connections, a rotatable control shaft located transversely of said table and ways, connections controlled by the rotation of said shaft to disengage the clutch, an abutment on the shaft, a clamping member screw-threaded on the shaft and actuated by the rotation thereof to clamp the ways and work support between said clamping member and said abutment, and means for controlling the angular position of the shaft alternatively to disengage the clutch and clamp the table to the ways, and to engage the clutch and unclamp the table.

6. In a milling machine, the combination of a work supporting table, ways on which the table is mounted to slide, driving connections for moving the work support on the ways, a clutch in said connections arranged to disconnect the table from said driving connections, a rotatable control shaft located transversely of said table and ways, connections controlled by the rotation of said shaft to disengage the clutch, means associated with said shaft for clamping the ways and table rigidly together, and means for controlling the rotated position of the shaft alternatively to disengage the clutch and clamp the table to the ways, and to engage the clutch and unclamp the table.

WALTER F. SMITH.